April 27, 1965    H. D. GARNER ETAL    3,180,587
ATTITUDE ORIENTATION OF SPIN-STABILIZED SPACE VEHICLES
Filed Jan. 25, 1961    3 Sheets-Sheet 1

INVENTORS
HOWELL D. GARNER
HENRY J. E. REID, JR.

BY

ATTORNEYS

April 27, 1965 H. D. GARNER ETAL 3,180,587
ATTITUDE ORIENTATION OF SPIN-STABILIZED SPACE VEHICLES
Filed Jan. 25, 1961 3 Sheets-Sheet 2

INVENTORS
HOWELL D. GARNER
HENRY J. E. REID, JR.

BY

ATTORNEYS

INVENTORS
HOWELL D. GARNER
HENRY J. E. REID, JR.

3,180,587
ATTITUDE ORIENTATION OF SPIN-STABILIZED SPACE VEHICLES
Howell D. Garner, Newport News, and Henry J. E. Reid, Jr., Yorktown, Va., assignors to the United States of America as represented by the Administrator of the National Aeronautics and Space Administration
Filed Jan. 25, 1961, Ser. No. 84,962
19 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to a guidance system for controlling the flight attitude of a spin-stabilized aerospace vehicle.

Of the many problems encountered in dispatching vehicles on orbital or probe missions beyond the atmosphere of the earth, few are more complex or difficult of solution than that of achieving and maintaining the desired vehicle attitude preceding and during final stage thrust generation. It is highly important that the attitude, or orientation of the vehicle with respect to a fixed reference plane, be correct upon final stage motor ignition and during burning; as a slight error, in the nature of a few seconds of arc, may result in failure of the vehicle to enter orbit or escape the gravitational field of the earth, with consequent failure of the orbital or probe mission. There are numerous factors which tend to create attitude errors in multi-staged aerospace vehicles, and almost all of these factors are variable in nature; the effects of which are difficult to predict prior to launch. Among the more important of these error producing factors are misalignment of the thrust axis with the radial center of gravity of the vehicle, which is capable of producing a force couple causing vehicle tilt, or change of attitude; wind shear, or high altitude wind variations; and separation torques. This last factor involves, in effect, one or more forces created by the very act of separating various stages of the vehicle. Of course, in the ideal separation event, no attitude error producing forces would be set up, but in practice, however, such ideal separation is seldom achieved.

The existence and unpredictable nature of these factors necessitate the provision in such a vehicle of some system of guidance control, in order to insure proper heading of the vehicle upon final stage firing. Various methods of attitude control are known, but, as explained more fully hereinafter, such known systems have proved inadequate to correct attitude errors in the final stage of a multi-staged vehicle. One control system which has been suggested in the past involves ground control, but the great altitudes involved make both observation of attitude error and transmission of correction command signals unreliable. Another control system suggested is that which is used in many current vehicles of this type, wherein an inertial attitude reference, for example a gyroscope, and an attitude programming device are mounted in the next-to-final stage and employed to control the vehicle from launch to final stage separation by means of individual sets of controls in each stage but the last. This system has two major disadvantages; the first being that the unguided final stage is released at an attitude influenced by any accumulated errors present in the earlier stages, which the control system cannot correct; the second being that provision of controls in each stage but the last unduly increases vehicle weight. Further, it has been suggested that the final stage be spun or rotated about the longitudinal axis thereof through a time span commencing at some instant before separation thereof from the preceding stage, and continuing through such separation, thereby causing action similar to that of a gyroscope, and, in accordance with well known gyroscopic or inertial principles, offering resistance to any forces tending to change the axis of rotation thereof. This system, which may be termed spin-stabilization of the final stage, has been found to significantly increase final stage attitude stability, and therefore to improve final stage attitude orientation capabilities when used in combination with any of the hereinbefore mentioned attitude control systems, since the final stage will tend to retain the attitude which is prevalent immediately after separation. However, as hereinbefore mentioned, even a small attitude error may cause failure of the entire vehicle mission if not corrected before final stage firing, and spin stabilization, which may be thought of as passive guidance control, has not proved to be capable of consistently achieving proper final stage attitude with the degree of accuracy necessary. An error in attitude prior to final stage separation will be retained in the spin-stabilized final section, and furthermore, the final stage, even though spinning, often is unable to counteract the undesirable effects of separation torques.

Thus, it is essential that some form of active, or positive, attitude orientation control be incorporated into the final stage, in addition to spin-stabilization, or passive guidance control. Design of such a final stage active orientation system requires consideration of several critical factors. The foremost of these is system weight, since every increase in weight of the orientation system decreases correspondingly the weight of the effective payload which the final stage can accelerate to orbital or probe velocity. Of substantial importance, also, is implicity of the system, since proper orientation control must be accomplished, at least in the case of unmanned vehicles, without human monitoring. Further, the orientation system must be of a type which will not be adversely affected by continuous vehicle rotation or roll, since the vehicle is spin-stabilized; and the system must be able to withstand high acceleration forces, adverse temperature conditions, and other environmental stresses. It is also desirable that system cost be minimized.

With these criteria in mind, it becomes apparent that the present state of the art affords no attitude orientation control system which suits the requirements of a system for performing the function of properly orienting a spin-stabilized vehicle before firing of the propulsion motors thereof. It has been suggested that a gyroscopic system be utilized in such a vehicle wherein variations of vehicle attitude from the line of the rotational axis of a gyroscope wheel could be sensed and proper attitude corrections could be made. This solution is impractical in a spin-stabilized vehicle, however, since the inherent tendency of a gyroscope to drift would be accentuated by vehicle spin. Further, a gyroscope may tend to accept and maintain that heading or attitude prevalent prior to final stage separation, unless some provision is made whereby the gyroscope may be reoriented after separation. Such a system would involve unduly complex structure and controls, with consequent weight penalties. It has also been suggested that once attitude errors have been sensed, correction be accomplished by varying the direction of thrust of the vehicle propulsion system, either by inserting blades or deflectors into the exhaust stream of the propulsion system, or by turning the propulsion motor relative to the vehicle. Either of these approaches obviously involves complex, heavy equipment, and also loss of much effective thrust of the propulsion system. None of the orientation systems of the prior art being suitable for final stage attitude control, it has become necessary to evolve a new concept of final stage orientation, and to implement this concept through assembly and utilization of light-weight, simple, rugged, low cost equipment. The present invention is the result of such a new concept of attitude orientation control, and the design of apparatus to implement such a concept.

Accordingly, it is an object of the instant invention to provide a lightweight, rugged attitude control system for spin stabilized vehicles.

Another object of the present invention is the provision of a spin-stabilized vehicle having an inexpensive, simplified active attitude control means carried therein.

A further object of the instant invention is the provision in a spin-stabilized vehicle of a horizon scanning attitude control device.

Still another object of the present invention is to provide a vehicle having horizon scanning means associated with reaction control devices arranged for positive flight attitude maintenance.

Yet another object of the present invention is the provision in a spin-stabilized vehicle of means to maintain said vehicle in an attitude perpendicular to the local horizon.

A still further object of the instant invention is to provide a spin-stabilized vehicle having control means for maintaining said vehicle at an attitude slightly out of perpendicularity with the local horizon.

Another further object of this invention is the provision of a vehicle having attitude control devices for insuring a flight path parallel to the local horizon.

Still another further object of the present invention is the provision of a vehicle having thrust producing means for controlling attitude of the vehicle in response to deviations thereof from a desired relationship with the local horizon.

Yet another further object of the instant invention is to provide an active attitude control system for a spin-stabilized vehicle in which the position of the vehicle relative to celestial bodies determines the positioning of a reference sensing means within the vehicle.

Yet still another object of this invention is the provision in a spin-stabilized vehicle of a star oriented horizon scanning vehicle attitude control system for maintaining a slightly non-perpendicular relationship between vehicle attitude and local horizon.

A yet still further object of the present invention is to provide a horizon scanning jet reaction control system for orienting a vehicle in generally horizontal attitude parallel to the local horizon.

Yet still another further object of the instant invention is the provision in a spin-stabilized vehicle of a force producing reaction device actuated by horizon scanning means for assuring maintenance of a desired relationship of the vehicle with the local horizon.

An additional object of this invention is to provide a method of controlling vehicle attitude through aligning said vehicle in the desired relationship with the local horizon by applying force to the vehicle in response to detected deviations from such relationship.

Another additional object of the present invention is the provision of a method of vehicle attitude orientation including continuously rotating the vehicle about an axis thereof, scanning along a line forming an acute angle with such axis and lying in a plane passing therethrough, and forcefully varying the attitude of the vehicle in response to any detected variations in attitude.

A further additional object of this invention is the provision of a method of vehicle attitude control including rotating the vehicle about an axis thereof, constraining a vehicle mounted scanning device to rotate about a line offset from such axis, sighting through the scanning device, and controlling attitude in response to attitude errors detected through such sighting.

According to the present invention, the foregoing and other objects are attained by providing a spin-stabilized final stage space vehicle comprising means for scanning the local horizon of a planetary body and means responsive to variation in vehicle attitude relative to such horizon from a desired relationship, as detected by the scanning means, for actuating force producing reaction means to vary vehicle attitude in a direction to achieve the desired relationship.

A more complete appreciation of the invention and the many attendant advantages thereof will be readily apparent as the same becomes better understood by reference to the following detailed description when considered in connection with the accompanying drawings wherein.

Figure 1:
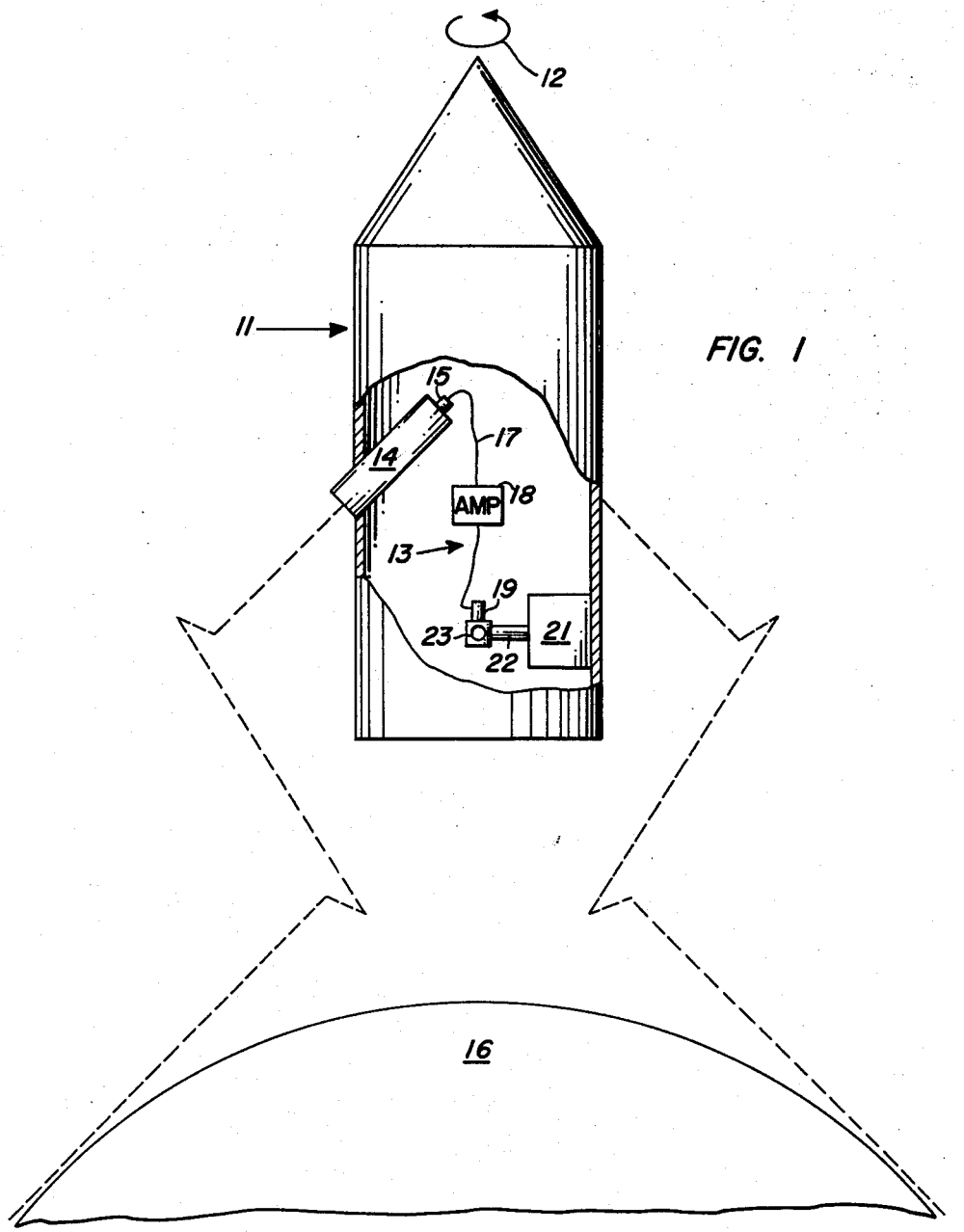
FIG. 1 is a side elevational view, partially in section, of a vehicle designed for spatial operation in a direction perpendicular to the local horizon.

Referring now more particularly to the drawings, and specifically to FIG. 1, there is shown a final stage space vehicle generally designated by reference numeral 11. It is to be understood that vehicle 11 is preferably the final stage of a multi-staged vehicle, the other stages of which are not shown, but which may include any conventional booster rockets. Vehicle 11 is adapted to be rotated rapidly about the longitudinal axis thereof, as by means of small reaction jets, not shown, mounted on a side thereof, or by means of a prime mover, not shown, mounted in a preceding stage of the multi-staged vehicle; such rotation being, for example, in the direction indicated by arrow 12. Thus, vehicle 11 may be said to be spin-stabilized, or passively attitude oriented; since in accordance with well known principles, such a spinning body will tend to resist any forces attempting to change the axis of rotation thereof.

Incorporated within vehicle 11 is an active orientation system generally designated by reference numeral 13, including a telescope 14 rigidly mounted in vehicle 11. Telescope 14 is conventional in form, and is thus shown only schematically. Mounted at the focal point of telescope 14 is a radiation sensitive detecting element 15, which may be, for example, a photocell or other similar conventional device. Since vehicle 11 is spin-stabilized, telescope 14 and detecting element 15 together constitute a scanning device which, during each rotation of vehicle 11, sweeps or traverses the surface of an imaginary spatial cone, as indicated by the dashed lines in FIG. 1. The angle between the axis of vehicle 11 and the axis of telescope 14 is so selected that, at the altitude at which the system will function, the apex angle of the imaginary spatial cone is such that the surface thereof will be generally tangential to the planet 16, but slightly spaced from the local horizon thereof. Accordingly, this local horizon will lie below the line of sight of telescope 14 if vehicle 11 is at an attitude perpendicular to the plane defined by the local horizon. Such an attitude may be said to exist when the spin axis of vehicle 11 is collinear with a radial line of planet 16, ignoring non-spheroidicity of said planet, which is generally slight. This attitude is hereinafter termed an attitude perpendicular to the local horizon, for purposes of simplicity of disclosure.

The levels of radiation emanating from a given planet and from the atmosphere or space surrounding the planet are sufficiently different to enable the detecting element 15 to readily detect a change in sighted radiation should the line of sight of telescope 14 intersect the horizon of planet 16 during any portion of the rotation thereof. Intersection of the horizon during the conical sweep will occur only if the attitude of vehicle 11 is not perpendicular to the local horizon. For a discussion of such radiation variations, and of various devices and circuitry for detecting same, reference may be had to United States Patent No. 2,740,961, issued April 3, 1956. Detecting element 15, as hereinbefore noted, may be a photocell or any other conventional radiation sensitive device for sensing such variations.

Detecting element 15 is so arranged and connected with proper circuitry 17, such as, for example, the sensing circuitry disclosed in the aforementioned patent, that whenever the line of sight of telescope 14 intersects the horizon of planet 16 the electrical signal from a power source, not shown, will be modified in such a way as to vary the input to amplifier 18 so as to create an output from said amplifier to actuate the solenoid of a solenoid valve 19. Since the details of circuitry 17, amplifier 18 and solenoid valve 19 are conventional and form no part of the present invention, these devices are shown only schematically. Any conventional switching amplifier may serve as amplifier 18, and solenoid valve 19 may be of the type which is opened upon the application of current thereto from the output side of amplifier 18.

Mounted at any convenient location in vehicle 11 is a container 21 which contains a supply of gas under pressure. Container 21 is connected through conduit 22 and solenoid valve 19 to jet nozzzle 23, illustratively positioned below the longitudinal center of gravity of vehicle 11, so that energization and consequent opening of solenoid valve 19 will allow a stream of gas to pass from container 21 through conduit 22 to emerge through nozzle 23. The path of discharge of nozzle 23 is along a line forming an angle of substantially 90° with the plane formed by telescope 14 and the axis of vehicle 11, and nozzle 23 may be arranged in an opening, not shown, in the side of vehicle 11, above or below the longitudinal center of gravity thereof.

The orientation or attitude control system is not utilized during the firing of the first stages of the multi-staged vehicle, and therefore in any desired portion of the circuitry, as, for example, between the power source, not shown, and detecting element 15, a switch, not shown, is provided which may be normally open to inactivate the attitude control system but which is adapted to be closed upon receipt of a command signal from the ground, or in response to separation of vehicle 11 from the preceding stage, or under control of an altimeter or the like.

Thus, at the desired instant, active orientation system 13 is activated; for example, immediately upon separation of vehicle 11 from the preceding stage. The rocket motors, not shown, with which vehicle 11 may be provided, are in a condition of preparedness to fire, but are not ignited until a sufficient time has passed for active attitude control system 13 to properly orient vehicle 111 with respect to planet 16. As vehicle 11 rotates, telescope 14, rotating therewith, continuously scans in a conical path, and should vehicle 11 be at an attitude of non-perpendicularity with the local horizon, the line of sight of telescope 14, at one portion of the rotation thereof, will intersect planet 16. At this instant, detecting element 15 will be activated to vary the input to amplifier 18, the output of which will energize solenoid valve 19 to open the valve element thereof, and consequently a stream of gas from container 21 will emerge through nozzle 23. The thrust developed at nozzle 23 will serve to precess vehicle 11 in a direction to return the same to an attitude perpendicular to the local horizon. Subsequent sweeps of scanner system 13 detect any need for further corrective action and nozzle 23 discharges gas accordingly. Thus, in a very short time and in a positive manner, the desired attitude is attained. Subsequently, the rocket motors of vehicle 11 are fired, and final vehicle velocity is reached. If desired, active guidance system 13 may continue to function during and even after firing. Alternatively, the active attitude control system may be mounted in a jettisonable package, not shown, rather than in the final stage as shown in FIG. 1, and ejected after it has corrected vehicle attitude, but before firing of the final stage rocket motors, thus reducing the weight of vehicle 11 for higher final velocity attainment.

Figure 2:
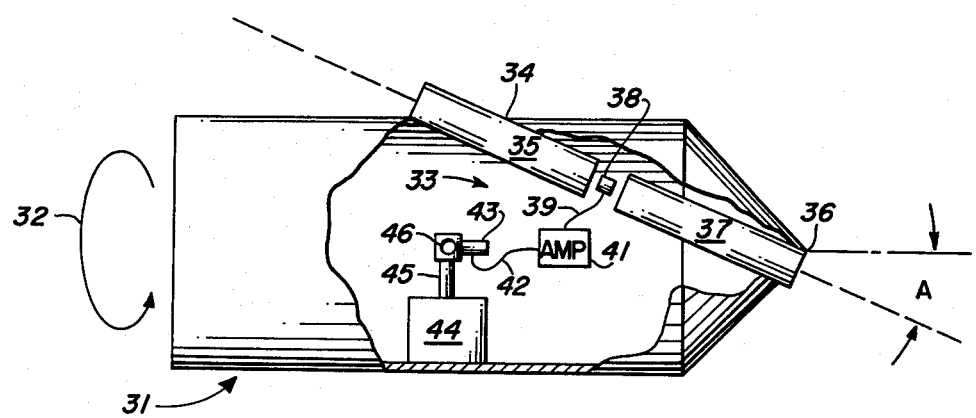
FIG. 2 is a similar view of an alternative embodiment of the vehicle designed for spatial operation parallel to the local horizon.

Referring now to FIG. 2, there is shown an alternative embodiment of the space vehicle of the present invention, in which a flight path parallel to the local horizon is desired. Vehicle 31 constitutes the final stage of a multi-staged vehicle having a propulsion motor, not shown, and may be spin-stabilized by rotation about an axis thereof in the direction indicated by arrow 32. Mounted in vehicle 31 is an active vehicle orientation system, generally designated by the reference numeral 33, for controlling the attitude thereof, which includes a first opening 34 in the vehicle body containing a first telescope 35 and a second opening 36 in the vehicle body carrying a second telescope 37 axially aligned with first telescope 35. Telescope 35 is arranged to sight generally rearwardly and telescope 37 is arranged to sight generally forwardly of vehicle 31, and these telescopes, being of conventional design, are shown only schematically. The line of sight of each of the telescopes 35, 37 forms an angle with the axis of rotation of vehicle 31 designated by the reference letter A, which angle is predetermined in accordance with the altitude at which the vehicle is to operate. For example, at an altitude of 100 miles above the earth, angle A would be approximately 13°, and at an altitude of 300 miles above the earth, angle A would be approximately 22°. For any given altitude above any given celestial body, the angle A is selected so that the conical sweep of each telescope 35, 37 will pass just above the planetary horizon if vehicle 11 is at an attitude parallel to a plane defined by the planetary horizon. In other words, when the vehicle is at an attitude perpendicular to a radial line drawn from the planet through the longitudinal center of gravity of the vehicle, neither telescope will sight the planet during a rotation of the vehicle, ignoring slight irregularities which may appear in the horizon due to non-spheroidicity of the planet or due to terrain irregularities. These irregularities may be compensated for by setting up the sweep of telescopes 35, 37 to normally miss the horizon by more than any anticipated irregularity; or, in other words, by making angle A slightly smaller than would be required for a perfectly spherical planet. This desired attitude is hereinafter referred to as an attitude parallel to the local horizon, for purposes of brevity of description.

Telescopes 35, 37 are mounted and constructed so as to have a common focal point, and at this common focal point is mounted a radiation detecting element 38, such as a photocell or the like, which together with the telescopes constitutes a scanning device. Detecting element 38 is arranged and connected with suitable circuitry 39 so that, if either telescope sights the planetary horizon, the signal from a power source, not shown, may be varied thereby before being fed into amplifier 41 so as to vary output therefrom conducted through output circuit 42 to solenoid valve 43. The details of circuit 39, amplifier 41, output circuit 42 and solenoid valve 43 being conventional and forming no part of this invention, these devices are shown only schematically. Solenoid valve 43 preferably may be of the type which opens upon the receipt of a signal through output circuit 42. Mounted at any convenient location in vehicle 31 is a container 44 containing a quantity of pressurized gas. Container 44 is connected through conduit 45 and solenoid valve 43 to jet nozzle 46, which may extend through an opening, not shown, in the side of vehicle 31. Nozzle 46 is preferably arranged to discharge gas along a line forming an angle of substantially 90° with the plane formed by the line of sight of telescopes 35, 37 and the axis of vehicle 31.

In operation, vehicle 31 may be carried aloft and accelerated to near-orbital velocity by one or more booster rockets, not shown, and then released therefrom by suitable separation devices, not shown. Immediately following final stage separation, active attitude control system 33 may be activated by closing a suitable normally open switch, not shown, in circuit 39 or output circuit 42. As hereinbefore discussed, closing of such a switch may be in response to a ground observer command signal, or responsive to such final stage separation, or controlled by an altimeter, accelerometer, or the like. As vehicle 31 spins about the axis thereof, telescopes 35 and 37 continuously sweep or traverse the surfaces of opposed imaginary spatial cones generated from a common apex, and should the axis of vehicle 31 assume either a "nose down" or "nose up" attitude, telescopes 37 or 35, respectively, will sight the horizon of the planet being orbited, with consequent actuation, through detecting element 38, circuit 39, amplifier 41, and output circuit 42, of solenoid valve 43. Thus a stream of gas from container 44 will pass through conduit 45 and solenoid valve 43 for discharge through jet nozzle 46, which is aligned so as to cause precession of vehicle 31 toward the proper attitude, parallel to the local horizon.

Figure 3:
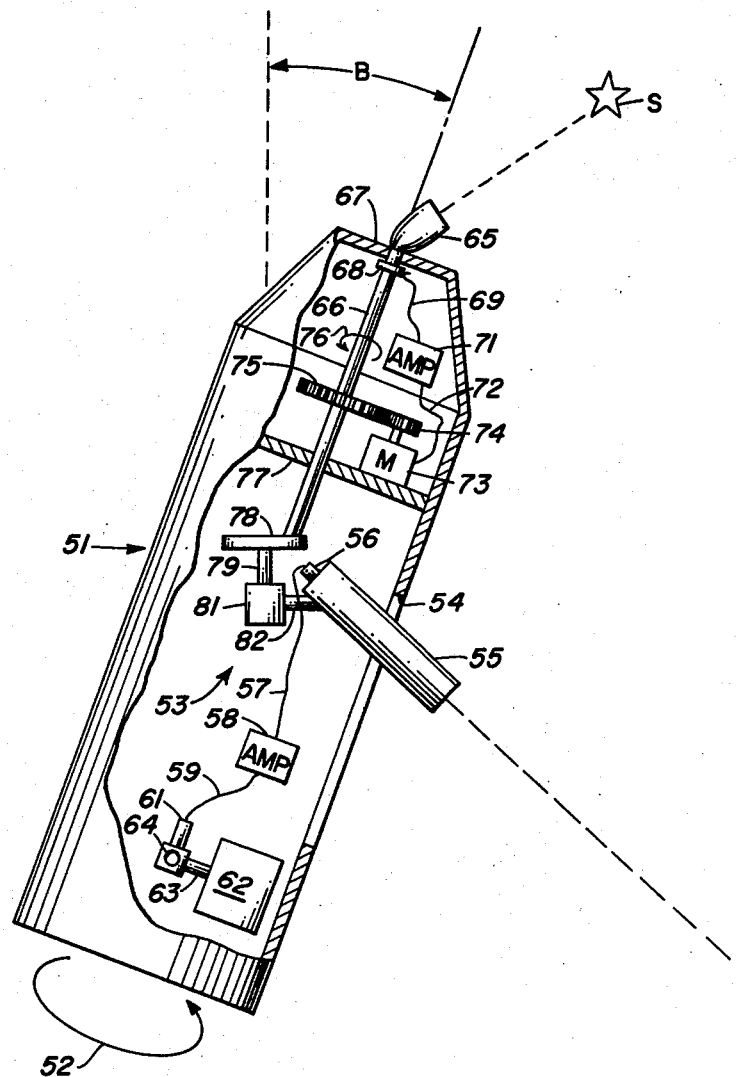
FIG. 3 is a similar view of another alternative embodiment of the vehicle designed for spatial operation along a flight path slightly non-perpendicular to the local horizon.

Referring now to FIG. 3, there is shown another alternative embodiment of the space vehicle of the present invention, which is designed for operation in an attitude slightly non-perpendicular to the planetary horizon. Vehicle 51 may be the last stage of a multi-staged vehicle, and is preferably spin-stabilized, as for example, in the direction shown by arrow 52. The active attitude control for vehicle 51 is provided by active orientation system 53, which is quite similar in detail and function to active orientation system 13, FIG. 1, hereinbefore described. Briefly, guidance system 53 includes, at an opening 54 in vehicle 51, a scanner telescope 55, at the focal point of which is mounted a radiation detecting element 56 connected through suitable conventional circuitry 57 to the input side of switching amplifier 58, and thence through output circuit 59 to solenoid valve 61. As in the systems of FIGS. 1 and 2, valve 61 when energized is opened to allow gas under pressure to flow from container 62 through conduit 63 to a discharge point at jet nozzle 64, which may extend through the side of vehicle 51 at an angle of substantially 90° to the plane formed by the longitudinal axis of vehicle 51 and the line of sight of telescope 55, at a point above or below the longitudinal center of gravity of vehicle 51. As in FIGS. 1 and 2, a switch, not shown, may serve to inactivate system 53 until after final stage separation. Up to this point, it may be seen that the apparatus shown in FIG. 3 corresponds to that of FIG. 1, and therefore, as in FIG. 1, whenever the line of sight of telescope 55 intersects the local planetary horizon, not shown, detecting element 56 will so modify the input signal to amplifier 58 that solenoid valve 61 is opened to produce thrust through jet nozle 64, thus precessing vehicle 51.

However, it is desired to provide an attitude for vehicle 51 which is slightly non-vertical; that is, an attitude which will form an acute angle with a radical line drawn from the planet to the vehicle and which is collinear with a predetermined azimuth. This angle may be on the order of the angle designated by the reference letter B in FIG. 3. Such an attitude may be reliably and simply attained by utilizing the mechanism now to be described.

As was seen in the discussion of FIG. 1, so long as a telescope such as 14 in FIG. 1, or 55 in FIG. 3, rotates about a vertical axis, no signal will be generated to open the solenoid valve, and hence no attitude correction will be initiated. Thus, to achieve controlled non-vertical flight, or a flight path slightly non-perpendicular to the local horizon, it is necessary to provide, in vehicle 51, an axis of rotation for telescope 55 which will be in a vertical position when the axis of vehicle 51 is offset from the vertical by the angle B. While provision of such an axis in a normal vehicle would be relatively simple, in a spin-stabilized vehicle it is not so easily accomplished.

According to the present invention, this axis is provided through the use of a star seeker 65, mounted on shaft 66, which in turn is journalled in suitable bearings, not shown, in forward portion 67 of vehicle 51 and runs axially therewith. The details of such star seeker may be conventional, and form no part of the present invention, and therefore the star seeker is shown only schematically. One specific type of the generic device here required may be found in United States Patent No. 2,923,202, issued Feb. 2, 1960. In order to adapt such a device for use in spin-stablized vehicle 51, there is provided on shaft 66 a slip ring 68 from which bush 69 carries signals generated by star seeker 65 to a phase sensitive amplifier 71, for a purpose hereinafter to be described.

A signal from a power source, not shown, is applied through motor control circuit 72 to servo motor 73, which is adapted to drive pinion 74 and shaft gear 75, which is keyed to shaft 66, in such a direction as to rotate shaft 66 relative to the vehicle 51 in the direction shown by arrow 76. The normal speed of motor 73 is so chosen that at the anticipated spin rate or roll rate of vehicle 51, the speed of rotation of shaft 66 in the opposite direction would be at the same rate, and that therefore shaft 66 would undergo no rotation at all relative to a fixed plane or axis. However, should the roll rate of vehicle 51 be other than that anticipated, shaft 66 would tend to rotate slightly relative to a fixed plane, and in doing so would attempt to turn star seeker 65 away from star S. This action, however, produces a voltage in the detection elements, not shown, of star seeker 65, which, through slip ring 68, brush 69, and phase sensitive amplifier 71 changes the input to motor 73 by increasing or decreasing a signal in motor control circuit 72. In other words, if motor 73 is running at too high a rate, thus causing rotation of shaft 66 relative to star S in the direction shown by arrow 76, then star seeker 65 will send an error signal to phase sensitive amplifier 71 which will cause said amplifier to decrease the signal in motor control circuit 72, thus reducing motor speed. Conversely, if motor 73 is running at too low a rate, thus allowing star seeker 65 to rotate with vehicle 51 in the direction of arrow 52, an error signal of the opposite phase will be sent to phase sensitive amplifier 71, thus causing, through circuit 72, an increase in speed by motor 73. Such circuitry and operation is conventional, and thus is shown only schematically herein. In this manner star seeker 65 and the attendant drive mechanism thereof can "hunt" until the proper speed for motor 73 is determined, which is the speed necessary to drive shaft 66 at such a rate that no rotation thereof relative to star S takes place.

The end of shaft 66 remote from star seeker 65 is suitably journalled in a brace or support 77, which also carries motor 73, and is rigidly fixed to the inner surface of vehicle 51. Attached to this end of shaft 66 through any suitable coupling means 78 is a pin 79. The geometry of the end of shaft 66, coupling means 78 and the end of pin 79 are so selected that pin 79 will have its axis at an angle B to shaft 66, and thus pin 79 is vertical when vehicle 51 is at the desired attitude and shaft 66 is no longer rotating relative to star S.

Slidably and rotatably mounted on pin 79 is sleeve 81, which carries, through arm 82, telescope 55. Thus, as vehicle 51 rotates, telescope 55 will rotate therewith, but is constrained through arm 82 and sleeve 81 to rotate about the axis of pin 79, which is vertical when vehicle 51 is in the desired, non-vertical attitude.

The operation of this invention, as shown in FIG. 3, may be summarized as follows. Once motor 73 has achieved the correct speed to maintain shaft 66 rotationally fixed relative to star S, any deviation by pin 79 from the vertical will be due to an attitude error in vehicle 51, which may be promptly corrected by active guidance system 53. Furthermore, since a star seeker is utilized to establish the position of the axis of rotation of telescope 55, the angle B is not merely randomly selected, but is chosen to establish the axis of rotation of the spin-stabilized final stage along a predetermined azimuth, as determined by star S. The advantages of so selecting this azimuth should be obvious; space vehicle 51 may thus be dispatched on a probe or other mission in such a direction that upon reentry thereof, or in the event of a mission abort, the vehicle will descend in a desired impact area, as, for example, at sea, rather than in populated regions or in terrain wherein prompt, undamaged recovery would become a problem. Obviously, one star which may be readily used for this azimuth control is the sun, but the present invention, in its broader aspects, contemplates star seekers which are adapted to "lock" on other stars.

It may be desirable in some applications of the present invention to include in the active attitude control system some form of system damping, in order to provide more accurately phased firing of the jet nozzle in response to attitude errors. While several types of damping means might be suggested, FIG. 4 illustrates one type of damping system which has been found to be particularly suited to the orientation system of any of FIGS. 1, 2 or 3.

Figure 4:
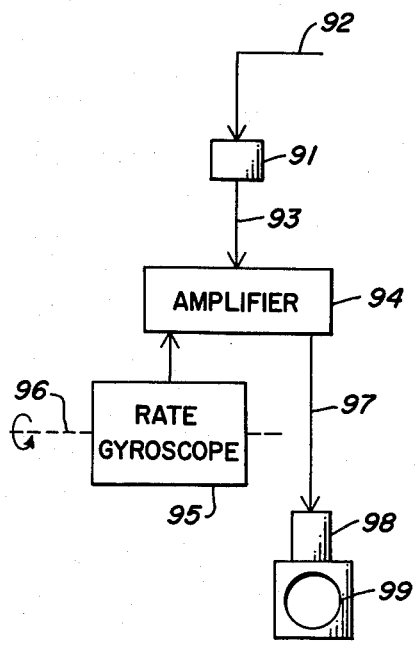
FIG. 4 is a diagrammatic view of a damped control system for use with the vehicles of FIGS. 1, 2 and 3.

More specifically, in FIG. 4 there is shown radiation detecting element 91, corresponding to element 15 of FIG. 1, element 38 of FIG. 2, or element 56 of FIG. 3, which is energized through power input lead 92. The signal from detecting element 91 is fed through amplifier input circuit 93 to amplifier 94, which corresponds to amplifiers 18, 41 and 58 of FIGS. 1, 2, and 3, respectively. Also fed into amplifier 94 is a damping signal from a conventional rate gyroscope 95 having a sensitive axis 96. The output of amplifier 94, as modified by the input signals from element 91 and rate gyroscope 95, is carried by amplifier output circuit 97 to solenoid valve 98, and thus controls the action of jet nozzle 99. It should be noted that sensitive axis 96 of rate gyroscope 95 lies at right angles to the line of thrust of nozzle 99.

Through the use of rate gyroscope 95 or similar system damping devices, the rate of angular motion of the vehicle can be taken into consideration in the duration and phasing of control signals sent to the reaction jet nozzle to control attitude.

In summary, it can be seen that the instant invention provides a simple, reliable active attitude control system for forcibly controlling the attitude of spin-stabilized vehicle. It is to be understood that, while many of the elements of this system have been shown only schematically, they may take various forms and locations within a given vehicle, and in practice such elements are generally smaller in relation to total vehicle size than they have been shown herein. The telescopes need not extend beyond the sides of vehicle, and the star scanner of FIG. 3 may be located other than as shown. Similarly, while electrical control circuitry has been hereinbefore discussed, hydraulic, mechanical, or pneumatic amplification and valve control means might be utilized. Devices such as small rockets or jets may be provided on the sides of any of the vehicles of FIGS. 1, 2, and 3, for spinning same.

It should be obvious also that present invention may be readily modified to provide a scanning system; the line of sight of which normally intersects the horizon, with proper control circuitry to initiate control reactions if, during a sweep thereof the atmosphere or space surrounding a celestial body be sighted.

The terms "planet" and "star" as used herein are intended to include any celestial body, and are used for purposes of brief, distinguishable description rather than for purposes of limitation.

While, as hereinbefore discussed, attitude correction control forces preferably may be produced by emission of gas from a source of pressurized gas, such as containers 21 of FIG. 1, 44 of FIG. 2, and 62 of FIG. 3, it is to be understood that other equivalent devices may be utilized, such as, for example, selectively actuatable hypergolic propellant rockets of known type. For this reason, the forcible attitude varying means herein contemplated, such as the gas containers, may be termed generically energy storage means. Similarly, the solenoid valves of FIGS. 1–4, or equivalent devices, may be termed retaining means, since they prevent the escape of stored energy. Together, then, the energy storage means and retaining means, such as the container and solenoid valve or the hypergolic propellant rocket and the activating mixing system therefor, constitute an actuatable force producing means, since, for example, by opening the valve, stored energy is released as force. Further, the various circuits may be termed actuating means, or circuitry means, since they serve such functions.

Obviously many modifications and variations of the present invention are possible in light of the teachings of this disclosure, and it is therefore to be understood that within the scope of the appended claims, the invention may be practiced otherwise than as specifically described.

What is claimed as new and desired to be secured by Letters Patent of the United States is:

1. In combination with a spin-stabilized space vehicle, an attitude control system comprising horizon scanning means mounted in said vehicle for rotation therewith, means connected to said horizon scanning means for generating a signal in response to sighting of a horizon by said horizon scanning means, and means connected to said signal generating means for forcibly varying vehicle attitude.

2. In combination with a spin-stabilized space vehicle, an attitude control system comprising horizon scanning means including a telescope mounted in said vehicle for rotation therewith, a radiation variation detector mounted at the focal point of said telescope for generating a signal in response to sighting of a horizon by said horizon scanning means, a container for storing pressurized gas, a conduit communicating with said container, a normally closed actuatable valve in said conduit, a nozzle mounted in said vehicle adjacent to the end of said conduit remote from said container and communicating therewith, valve actuating means connected to said normally closed actuatable valve, and circuitry connecting said radiation variation detector to said valve actuating means, whereby when said radiation variation detector sights a horizon the attitude of the vehicle is forcibly varied.

3. The combination as set forth in claim 2, wherein said telescope is rigidly mounted on a side of said vehicle.

4. The combination as set forth in claim 2, wherein said telescope is mounted within said spin-stabilized vehicle for rotation about an axis disposed at an acute angle to the spin axis of said spin-stabilized vehicle.

5. In combination with a spin-stabilized space vehicle, an attitude control system comprising horizon scanning means mounted in said vehicle for rotation therewith including a generally forwardly scanning device and a generally rearwardly scanning device, means connected to said horizon scanning means for generating a signal in response to sighting of a horizon by said horizon scanning means, and means connected to said generating means for forcibly varying vehicle attitude.

6. The combination as set forth in claim 5, wherein said scanning devices include telescopes.

7. The combination as set forth in claim 6, wherein said scanning devices include a common radiation variation detector, said radiation variation detector being mounted at the focal point of said telescopes.

8. The combination as set forth by claim 6, wherein said means for changing vehicle attitude includes a reaction jet having a line of thrust disposed at right angles to the plane of sight of said telescopes.

9. In combination with a spin-stabilized space vehicle having a spin axis, an attitude control system comprising a scanning device mounted within said spin-stabilized vehicle, means for providing an axis of rotation disposed at an acute angle to said vehicle spin axis for said scanning device, said means comprising a shaft, a drive motor operably connected to said shaft, and motor control means for driving said motor at a speed determined by vehicle spin rate.

10. The combination set forth in claim 9, wherein said motor control means comprises means for determining vehicle spin rate relative to a fixed object, and means connected to said determining means for establishing a motor input signal proportional to said spin rate.

11. In a spin-stabilized space vehicle having a spin axis, an attitude control system including a scanning device, means for providing a rotational axis for said scanning device comprising a shaft journalled in said vehicle, a star seeker mounted on said shaft, a motor mounted within said vehicle, means operably connecting said motor to said shaft for causing shaft rotation relative to said vehicle and opposite in angular displacement to vehicle spin, means for deriving a signal from said star seeker proportional to a difference in angular velocity of said shaft and said vehicle, means connecting said signal deriving means to said motor for controlling the speed thereof, and means connecting said shaft to said scanning device.

12. The space vehicle set forth in claim 11, wherein said scanning device comprises a telescope, said means connecting said shaft to said scanning device including a pin and a coupling connecting said pin to said shaft so as to form an acute angle between the axis of said pin and the axis of said shaft.

13. The space vehicle as set forth in claim 11, wherein said shaft is journalled along the spin axis of said vehicle.

14. The space vehicle set forth in claim 11 wherein said scanning device comprises a telescope and a radiation variation detector mounted at the focal point of said telescope.

15. The space vehicle as set forth in claim 14 comprising circuitry connecting said radiation variation detector to an actuatable force producing means, and means in said circuitry operable upon a variation in radiation detected by said radiation variation detector to actuate said force producing means.

16. In a spin-stabilized space vehicle having a spin axis, means for providing an axis that is disposed at an angle to said spin axis, that is rotative relative to said space vehicle and that is substantially rotationally fixed relative to a stationary object, a horizon scanning device, and means for constraining said horizon scanning device to rotate about said axis that is disposed at an angle to said spin axis.

17. A space vehicle as set forth in claim 16, wherein said horizon scanning device comprises a telescope and a radiation variation detector.

18. The combination as set forth in claim 1 wherein said horizon scanning means includes two telescopes mounted in axial alignment with each other.

19. The combination as set forth in claim 18 wherein said telescopes are so mounted as to have a common focal point and said means for generating a signal includes a radiation detector mounted at said common focal point.

References Cited by the Examiner

UNITED STATES PATENTS

| | | | |
|---|---|---|---|
| 2,415,348 | 2/47 | Haigney | 102—50 |
| 2,963,243 | 12/60 | Rothe | 244—1 |
| 2,973,162 | 2/61 | Haeussermann | 244—1 |
| 2,991,027 | 7/61 | Geyling | 244—1 |

OTHER REFERENCES

Advances in Space Science, Volume 2, 1960, pages 415–421 and 433–436.

Jet Propulsion, Volume 28, November 1958, pages 747–750.

FERGUS S. MIDDLETON, *Primary Examiner.*

MILTON BUCHLER, *Examiner.*